US006264516B1

(12) United States Patent
McEathron et al.

(10) Patent No.: US 6,264,516 B1
(45) Date of Patent: Jul. 24, 2001

(54) OUTBOARD MOTOR WITH DISCONNECTABLE SHIFT SELECTION AND THROTTLE CONTROL IN A TILLER HANDLE

(75) Inventors: William W. McEathron, Fon du Lac; Jeffery L. White, Oshkosh, both of WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/487,017

(22) Filed: Jan. 19, 2000

(51) Int. Cl.[7] .................................................... B60K 41/00
(52) U.S. Cl. ................................ 440/84; 440/86; 440/87
(58) Field of Search .................................. 440/84, 86, 87

(56) References Cited

U.S. PATENT DOCUMENTS

| | | | | |
|---|---|---|---|---|
| 2,682,248 | * | 6/1954 | Sitz | 440/86 |
| 2,729,186 | | 1/1956 | Kloss | 115/18 |
| 2,971,618 | * | 2/1961 | Morse | 477/113 |
| 3,115,050 | * | 12/1963 | Marr | 477/113 |
| 3,145,688 | | 8/1964 | Kincannon | 115/18 |
| 3,503,360 | | 6/1967 | Hoff | 115/18 |
| 3,581,603 | * | 6/1971 | Farrington | 477/113 |
| 3,780,842 | * | 12/1973 | Whipple et al. | 192/0.096 |
| 3,820,641 | * | 6/1974 | Borst et al. | 192/0.096 |
| 3,828,902 | * | 8/1974 | Saito et al. | 192/0.096 |
| 3,929,039 | * | 12/1975 | Comstedt | 74/878 |
| 4,013,155 | * | 3/1977 | Olsen | 192/0.096 |
| 4,027,555 | * | 6/1977 | Rauchle et al. | 74/878 |
| 4,144,956 | * | 3/1979 | Baba | 192/0.096 |
| 4,213,353 | * | 7/1980 | Floeter | 74/878 |
| 4,323,356 | | 4/1982 | Stephenson | 440/86 |
| 4,582,493 | * | 4/1986 | Toyohara et al. | 440/84 |
| 4,718,869 | * | 1/1988 | Fisher | 440/1 |
| 4,829,846 | | 5/1989 | DeSalvo et al. | 74/547 |
| 5,083,951 | * | 1/1992 | Baba | 440/86 |
| 5,242,320 | * | 9/1993 | Schmidt et al. | 440/86 |
| 5,340,342 | | 8/1994 | Boda et al. | 440/86 |
| 5,545,064 | * | 8/1996 | Tsunekawa et al. | 440/53 |

* cited by examiner

*Primary Examiner*—S. Joseph Morano
*Assistant Examiner*—Ajay Vasudeva
(74) *Attorney, Agent, or Firm*—William D. Lanyi

(57) ABSTRACT

An outboard motor is provided with a tiller handle that enables an operator to control the transmission gear selection and the throttle setting by rotating the hand grip of the tiller handle. It also comprises a means for allowing the operator to disengage the gear selecting mechanism from the throttle mechanism. This allows the operator to manipulate the throttle setting without having to change the gear setting from neutral position.

19 Claims, 6 Drawing Sheets

FIG. 2
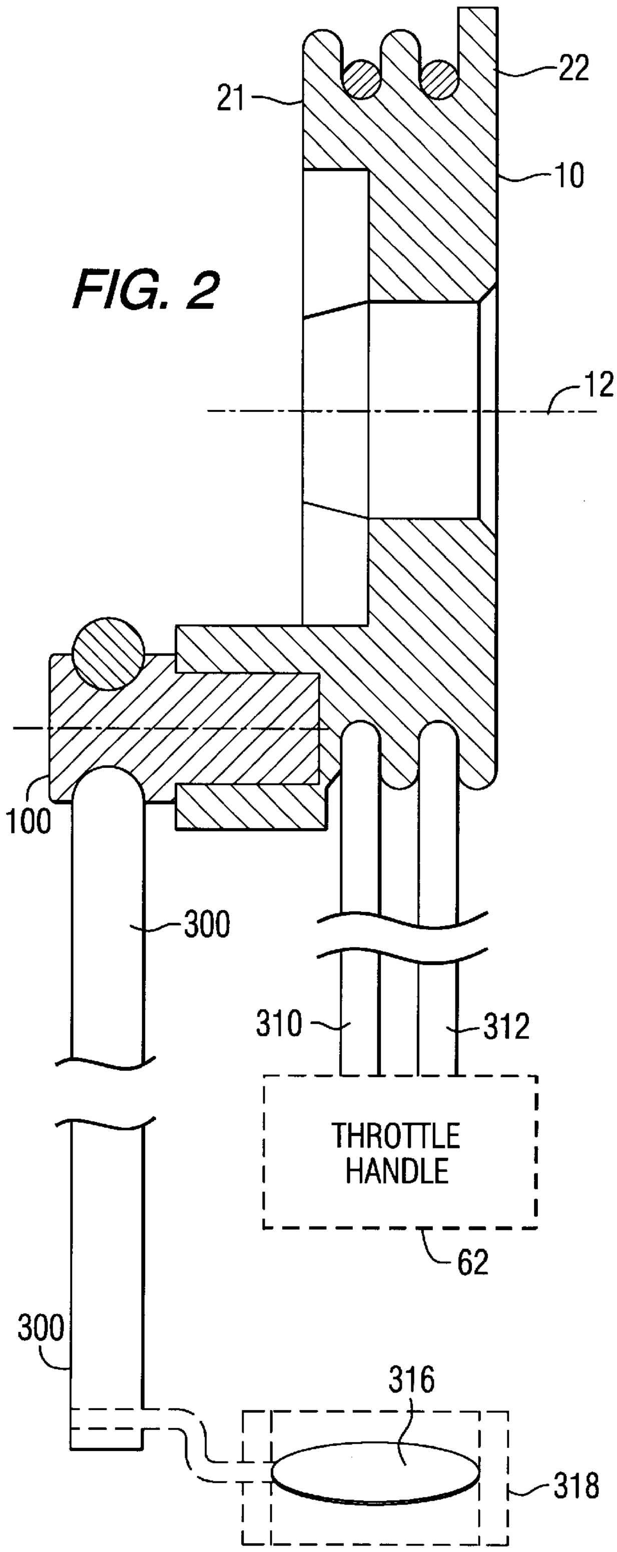
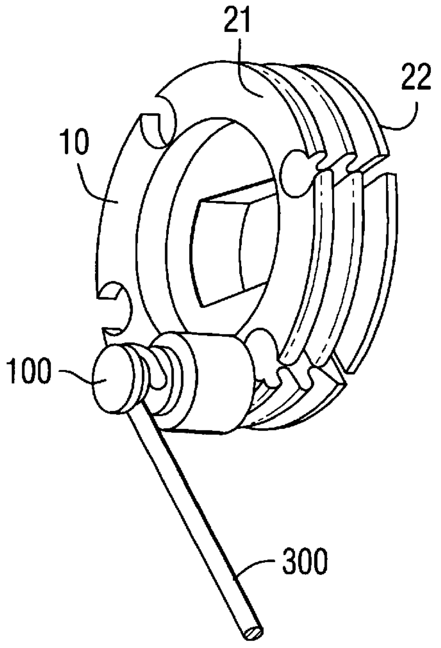
FIG. 3

OUTBOARD MOTOR WITH DISCONNECTABLE SHIFT SELECTION AND THROTTLE CONTROL IN A TILLER HANDLE

BACKGROUND OF THE INVENTION

1. Field of the Invention

The present invention is generally related to an outboard motor with throttle control and gear selector mechanisms in the tiller handle and, more particularly, to an outboard motor that is capable of disconnecting the gear selector mechanism from the throttle mechanism by manually selection.

2. Description of the Prior Art

Outboard motors have had tiller handles with throttle control mechanisms for many years. Typically, a hand grip of the tiller handle is movable, or rotatable, by manual control to change the throttle position of the engine of the outboard motor. Certain outboard motors also provide the operator with the capability of changing gears, from forward to reverse and vice versa, by moving the same handle grip.

U.S. Pat. No. 5,340,342, which issued to Boda et al on Aug. 23, 1994, discloses a universal tiller handle with shift and throttle controls. The tiller handle is provided for use with one or more push-pull cables interconnected to the shift and the throttle mechanisms of an outboard marine engine to control the shift and the throttle operations of the engine. The tiller handle includes a rotatable cam member with one or more cam tracks located on its outer surface. Each push-pull cable is maintained within a distinct cam track such that rotating the rotatable cam member actuates the push-pull cables thereby controlling the operation of the shift and the throttle mechanisms of the engine.

U.S. Pat. No. 4,829,846, which issued to DeSalvo et al on May 16, 1989, describes a marine propulsion device with a releasable shift handle. The device comprises a mounting bracket adapted to be mounted on the transom of a boat, a propulsion unit mounted on the mounting bracket for pivotable movement relative thereto about a generally vertical steering axis, a propeller unit including a pivotally mounted propeller and an engine drivingly connected to the propeller by a transmission, and a shift handle assembly including an inner member mounted on the propulsion unit for movement relative thereto, the inner member being connected to the transmission for actuation of the transmission in response to movement of the inner member, an outer member movable between spaced first and second positions relative to the inner member, and a bolt for securing the outer member in the first position so as to cause movement of the inner member in response to movement of the outer member, and for selectively permitting movement of the outer member to the second position.

U.S. Pat. No. 4,323,356, which issued to Stephenson on Apr. 6, 1982, describes a marine transmission control with vibration isolation system. The marine propulsion device comprises a marine propulsion unit including an engine and a rotatably mounted propeller, together with a transmission operatively connected with the engine and the propeller for operation between a neutral position and a drive position. The shift control mechanism further includes an isolation assembly for transmitting the operative forces from the control handle to the transmission while isolating the transmission of vibratory forces from the transmission to the control handle.

U.S. Pat. No. 4,213,353, which issued to Floeter on Jul. 22, 1980, discloses a control unit for marine engines employing throttle only control. The control unit for an engine of the type requiring shifting control between forward, neutral and reverse and throttle control for engine speeds between idle and high speed includes a housing having a control handle rotatably supported by the housing. Shift and throttle linkage means within the housing are connected to the engine and are responsive to rotation of the handle for separate control of the shift and throttle of the engine during respective portions of the arc of rotation of the handle. A throttle only shaft extends from the housing and is connected to the handle. A latch means is connected to the throttle only shaft to engage and disengage the shift linkage while permitting operation of only the throttle function responsive to rotation of the handle.

U.S. Pat. No. 3,503,360, which issued to Hoff on Mar. 31, 1970, describes an outboard motor clutch and interlock mechanism. In an outboard motor, a self contained clutch assembly of the readily releasable coil spring type is mounted immediately below the motor head, as a coupling between the power shaft and the drive shaft. The clutch is biased to the engaged condition and is released by a shift handle operable from front or rear which moves a stop to obstruct rotation of the leading end of the clutch spring. A blocker actuated by the throttle prevents clutch actuation above a selected motor speed.

U.S. Pat. No. 3,145,688 which issued to Kincannon on Aug. 25, 1964, describes a shift control by manipulation of a tiller handle. The tiller is pivoted to the motor for swinging movement in a vertical plane relative to a normal steering position to control the reversing clutch. When the tiller is raised from its normal steering position, the reversing clutch is in neutral. As the tiller is moved downwardly into normal steering position, the reversing clutch is engaged. A button in the end of the tiller is used to determine whether the engagement will be for forward or for rearward propulsion. The linkage operable by the tiller and the control button to actuate the clutch does not preclude the use of a tiller equipped with throttle control if desired.

U.S. Pat. No. 2,729,186, which issued to Kloss on Jan. 3, 1956, describes a control mechanism for outboard marine motors. The device provides a control means for outboard motor power transmission mechanisms in which the propeller of the motor may be placed in neutral, forward, or reverse drive conditions. With this arrangement, when it is desired to shift from a drive condition to a neutral position, the operator can use a shift control element providing a tiller handle for the motor, whereby direction of travel, speed of the motor, and forward, neutral, and reverse drive conditions, are all subject to instant control of the operator.

The patents described above are hereby explicitly incorporated by reference in the description of the present invention.

While the mechanism described in U.S. Pat. No. 5,340,342 and subsequent variations of that concept provide a significant benefit for the operator of an outboard motor, certain disadvantages can be experienced under particular conditions. For example, on occasion it is desirable to increase the operating speed of the engine without shifting out of the neutral gear position into either forward or reverse gear. For example, this can occur when the engine is initially started under certain conditions and when it is desirable to increase the operating speed of the engine during a warm up period. Outboard motors with both gear selection capability and throttle selection capability contained in the tiller handle, as presently known to those skilled in the art, do not allow the engine speed to be increased beyond a certain minimal magnitude without also shifting the transmission out of the neutral gear position to either forward or reverse gear. It would therefore be highly desirable if an outboard motor with both gear selection and throttle selection capability contained within the tiller handle could be made in such a way that the engine speed could be affected without having to shift the transmission out of neutral.

SUMMARY OF THE INVENTION

An outboard motor made in accordance with the present invention comprises a manually move able member, such as the hand grip of a tiller. It also comprises a gear selecting mechanism responsive to movement of the manually moveable member for selecting one of at least two operating modes of the outboard motor. Typically, the operating modes are forward and reverse and also comprises a neutral gear position. A throttle mechanism is provided which is responsive to the movement of the manually moveable member for changing the operating speed of the outboard motor. The throttle mechanism is linked, through a mechanical linkage or a cable connection, to a pivot arm that changes the position of a throttle mechanism within a throttle body. This affects the amount of air flowing into the engine and, as a result, changes the operating speed of the engine. The outboard motor further comprises a connector that is associated with the gear selecting mechanism and with the throttle mechanism. The connector connects the gear selecting mechanism and the throttle selecting mechanism together for coordinated movement in response to the movement of the manually moveable member. The outboard motor further comprises a disconnector associated with the connector to temporarily disable the connector and permit the throttle mechanism to move independently of the gear selecting mechanism.

In a particularly preferred embodiment of the present invention, the manually moveable member is attached to a tiller handle of the outboard motor. It can be a rotatable hand grip of the tiller handle. The throttle mechanism can comprise two cables that are arranged in a push-pull association with each other and the two cables can be connected to a common pulley member. The pulley member is rotated about its axis of rotation in coordination with the manually moveable member.

The throttle mechanism comprises a cable connected between the throttle mechanism and a throttle of an engine of the outboard motor. The connector can be a pin that is disposed in contact with both the gear selecting mechanism and the throttle mechanism.

The disconnector is an actuator which moves the connector out of contact with a preselected one of the gear selecting mechanism and the throttle mechanism. The disconnector can be manually moveable and, in a particularly preferred embodiment of the present invention, can extend partially through a cowl of the outboard motor and can be moveable by pushing an end of the disconnector inward toward an outer surface of the cowl.

BRIEF DESCRIPTION OF THE DRAWINGS

The present invention will be more fully and completely understood from a reading of the description of the preferred embodiment in conjunction with the drawing in which:

FIG. 2 is a section view of a common pulley element of the present invention;

FIG. 3 is a perspective view of the pulley element of FIG. 2;

DESCRIPTION OF THE PREFERRED EMBODIMENT

Figure 1:
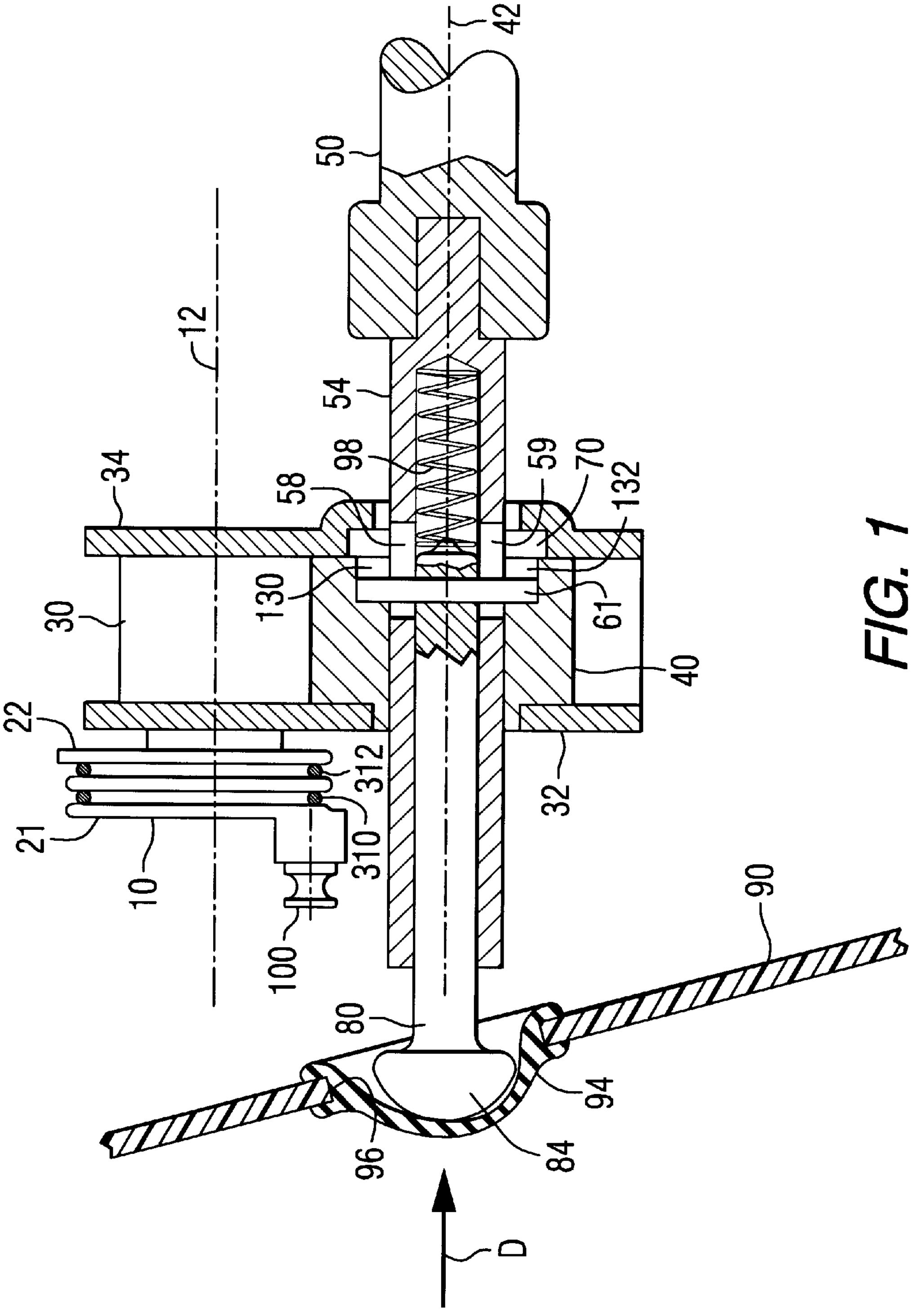
FIG. 1 is a section view of the present invention.

Throughout the description of the preferred embodiment of the present invention, like components will be identified by like reference numerals.

Figure 11:
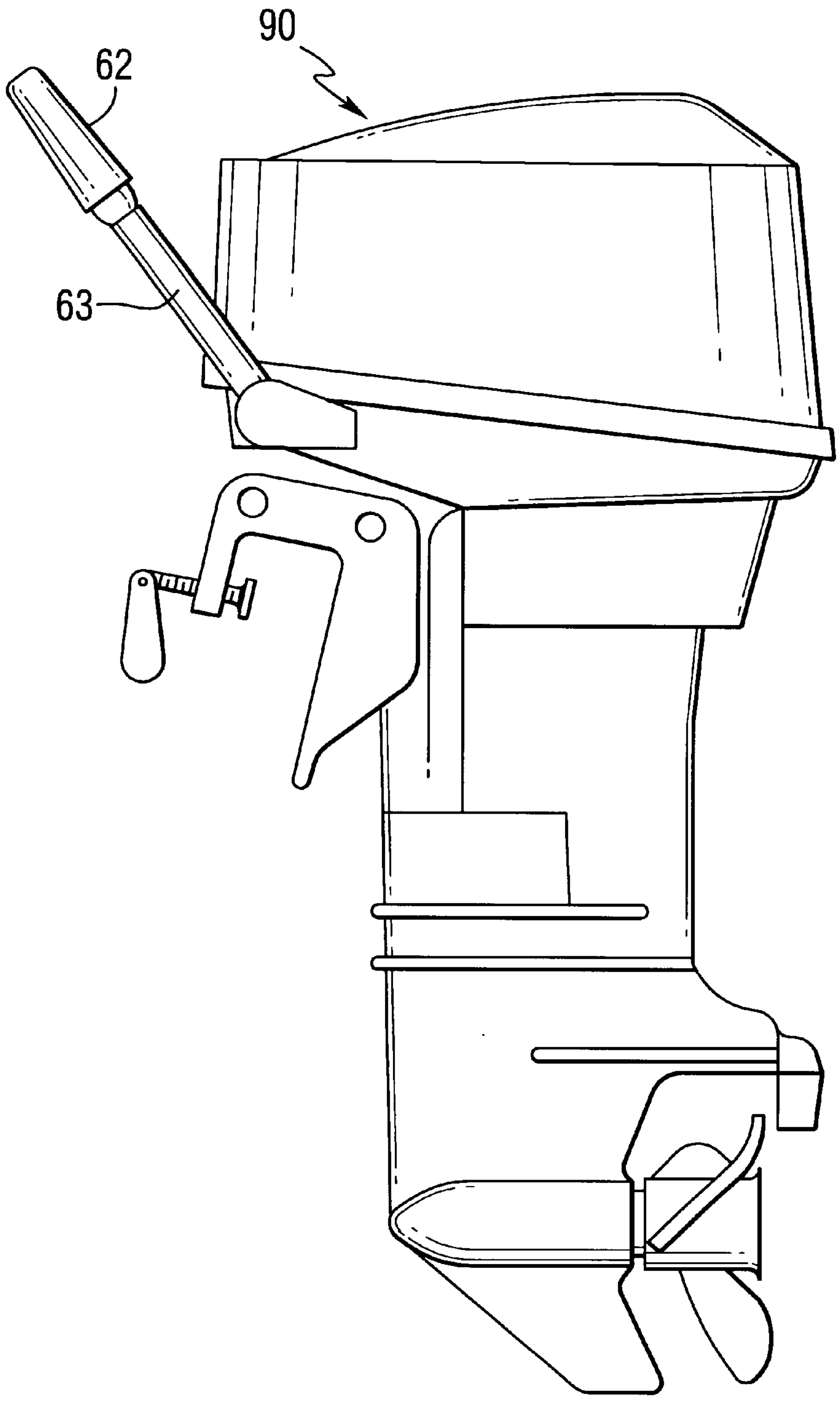
FIG. 11 PRIOR ART
FIG. 11 shows the prior art illustration from U.S. Pat. No. 5,340,342.

FIG. 1 is a section view taken through a shift mechanism of an outboard motor. Although the engine and other commonly known components of the outboard motor are not shown in FIG. 1, these elements are very well known to those skilled in the art, shown in the prior art described above, and will not be described herein. Also not shown in FIG. 1 but identified in FIG. 11 is a manually moveable hand grip 62 of a tiller handle 63 that an operator of an outboard motor can manipulate to change the throttle setting of the engine and, in certain cases, to change the gear selection setting of the transmission of the outboard motor. This type of hand grip 62, or manually movable member is described in U.S. Pat. No. 5,340,342 (where it is identified by reference numeral 62) and is commonly used on virtually every outboard motor currently in use today. The outboard motor shown in FIG. 1 of U.S. Pat. No. 5,340,342 is illustrated in FIG. 11 of the present application. When the hand grip is rotated about its axis of rotation, which generally extends along the length of the tiller handle, a common pulley member 10 is caused to rotate about its axis of rotation 12. The common pulley member comprises two pulley elements, 21 and 22, which are formed as a common unit and rotate together in response to movement of the hand grip of the tiller handle. Two cables, 310 and 312 extend between the pulleys, 21 and 22, and a mechanism in the tiller handle to cause the common pulley member to rotate about axis 12 in response to rotation of the hand grip. As will be described in greater detail below, a throttle control cable is attached directly to the common pulley element 10 and moves in direct response to movement of the handle grip of the tiller.

A drive gear 30 is rigidly attached to the common pulley member 10 and rotates with the common pulley member about axis 12. A support structure is formed by plates 32 and 34 to support the driving gear 30. A driven gear 40 is also supported by the structure formed by plates 32 and 34 for rotation about axis 42. A shift shaft assembly 50 comprises a tubular portion 54 which is provided with slots, 58 and 59. A pin 61 extends through the slots, 58 and 59, and into slots within the driven gear 40. When the pin is in the position represented by FIG. 1, the tubular portion 54 is restrained and forced to move about axis 42 in synchronization with the driven gear 40. If, on the other hand, pin 61 is moved toward the right and into the pocket 70 of plate 34, rotation of the driven gear 40 about axis 42 will not cause the tubular member 54 of the shift shaft assembly 50 to rotate with it. If the tubular member 54 does not rotate about axis 42, the shift shaft assembly 50 will also not rotate because the tubular member 54 is rigidly attached to the portion of the shift shaft assembly 50 shown at the right side of FIG. 1. The pin 61 serves as the connector of the present invention which is associated with both the gear selecting mechanism and the throttle selecting mechanism.

With continued reference to FIG. 1, it should be understood that the gear selecting mechanism of the present invention comprises the shift shaft assembly 50 and its tubular member 54. These components can operate in response to movement of the driven gear 40 which, in turn, rotates about axis 42 when the driving gear 30 rotates about axis 12. The gear selecting mechanism, comprising the shift shaft assembly 50 and its attached elements, can be connected to the throttle mechanism when pin 61 is located at their leftward position in FIG. 1 which locks the tubular member 54 to the driven gear 40.

The throttle mechanism of the present invention comprises the common pulley member 10 and a cable that is connected to the common pulley member 10 as will be described in greater detail below. The present invention allows the throttle mechanism to be separated for independent operation with respect to the gear selecting mechanism.

A disconnector 80 is moveable along a direction represented by arrow D in FIG. 1 in response to an operator pushing against a distal end 84 of the disconnector. As can be seen, a preferred embodiment of the present invention comprises a generally cylindrical rod that is used as the disconnector 80 and a head is provided at the distal end 84. When an operator presses against the head 84 to cause the disconnector 80 to move in the direction of arrow D, the pin 61 is moved toward the right and into the pocket 70, or space, formed in plate 34. This movement of the pin 61 out of the driven gear 40, allows the driven gear 40 to rotate about axis 42 without causing the tubular member 54 to rotate with it. As a result, the shift shaft assembly 50 does not rotate about axis 42. Therefore, the operator can manipulate the hand grip of the tiller and cause the two cables to rotate the common pulley element 10 about axis 12. This allows the operator to change the throttle setting without affecting the rotational position of the tubular member 54 or the shift shaft assembly 50. Therefore, the throttle setting can be changed without affecting the gear selection. Even though the driving gear 30 and the driven gear 40 both rotate about their respective axes, the gear selection can remain in neutral as the operator increases the engine speed.

The distal end of the disconnector 80 extends through an opening in the cowl 90. The opening can be covered by a flexible cover 94 which seals the opening 96, but allows the operator to push against the head of the disconnector 80 and operate the present invention.

With continued reference to FIG. 1, it can be seen that a spring 98 is provided within the central opening of the tubular member 54 to urge the disconnector 80 toward the left in FIG. 1. As a result, when the operator rotates the handle grip of the tiller back toward its central position, the spring 98 will force the pin 61 into its leftward position within the driven gear 40 when the throttle mechanism reaches a low engine speed position. This movement of the pins toward the left and into the driven gear 40 will reengage the shift shaft assembly 50 to the driven gear 40. Further rotation of the hand grip will then cause both a change in throttle setting and a movement of the shift shaft assembly 50.

FIG. 2 is a section view of the common pulley member 10. FIG. 2 also shows an insert 100 attached to the common pulley element 10 which is attachable to a link rod 30 that extends between the common pulley member and the throttle plate 316 within a throttle body 318 of the engine. When the common pulley member 10 rotates about axis 12, in the manner described above in conjunction with FIG. 1, the link rod 300 is moved from a central position in either a clockwise or counterclockwise direction about axis 12 to increase the operating speed of the engine by moving the throttle. As described above in conjunction with FIG. 1, two cables are disposed in the tracks, 21 and 22, of the individual pulley elements to allow movement of the handle grip to cause movement of the common pulley element 10 about axis 12.

FIG. 3 is an isometric view of the common pulley member 10 with its two pulley tracks, 21 and 22, and the insert 100 to which the throttle cable is connected.

Figure 4:
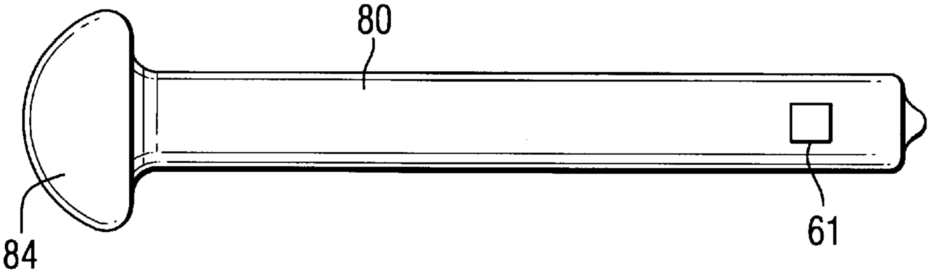
FIG. 4 is a detailed view of a disconnector of the present invention.

FIG. 4 shows the disconnector 80 and the distal end 84 against which an operator can push to disengage the gear selecting mechanism from throttle mechanism. The outer cylindrical surface of the disconnector 80 is shaped to slidably fit within the inner cylindrical opening of the tubular member 54. The pin 61 is shown extending from the disconnector 80.

Figure 5:
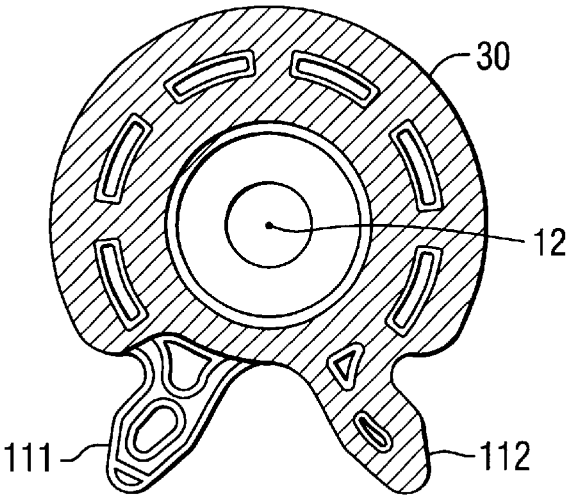
FIGS. 5 and 6 show the driving gear of the present invention.

FIG. 5 is a section view of the driving gear 30. The driving gear 30 has two teeth, 111 and 112, which mesh with a tooth 121 of the driven gear 40. Axis 12 appears as a point in FIG. 5. It should be understood that the rotation of the driving gear 30 and the driven gear 40 about their respective axes typically only comprises a rotation of 90 degrees or less. These rotations are directly related to the rotation of the throttle plate about its axis of rotation. As a result, minimal movement about the various rotatable members is sufficient to affect the desired changes in the throttle setting and the gear selections.

Figure 6:
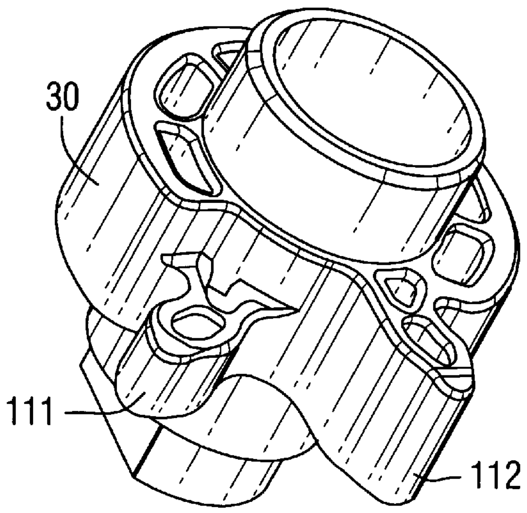

FIG. 6 is an isometric view of the driving gear 30 with its two driving teeth, 111 and 112.

Figure 7:
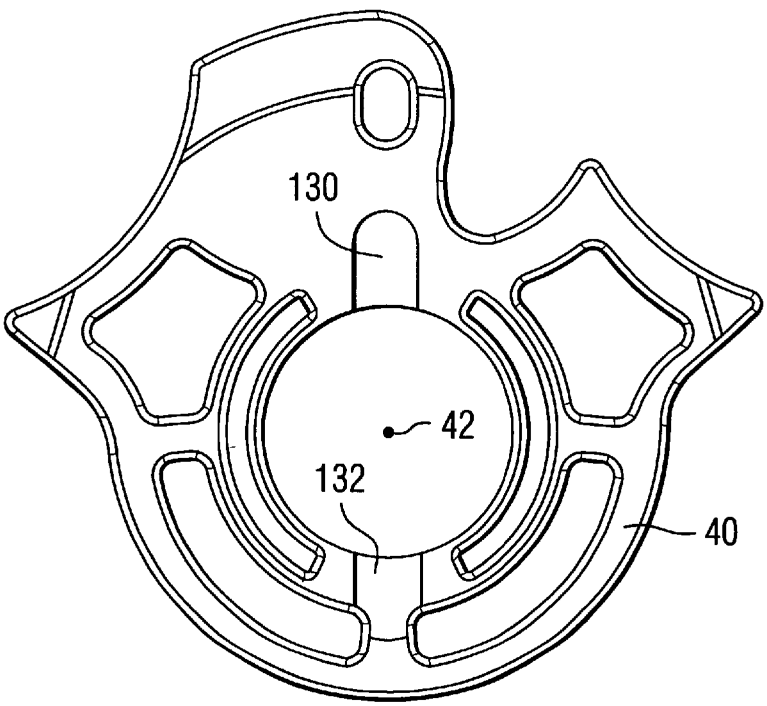
FIGS. 7 and 8 show the driven gear of the present invention.
Figure 8:
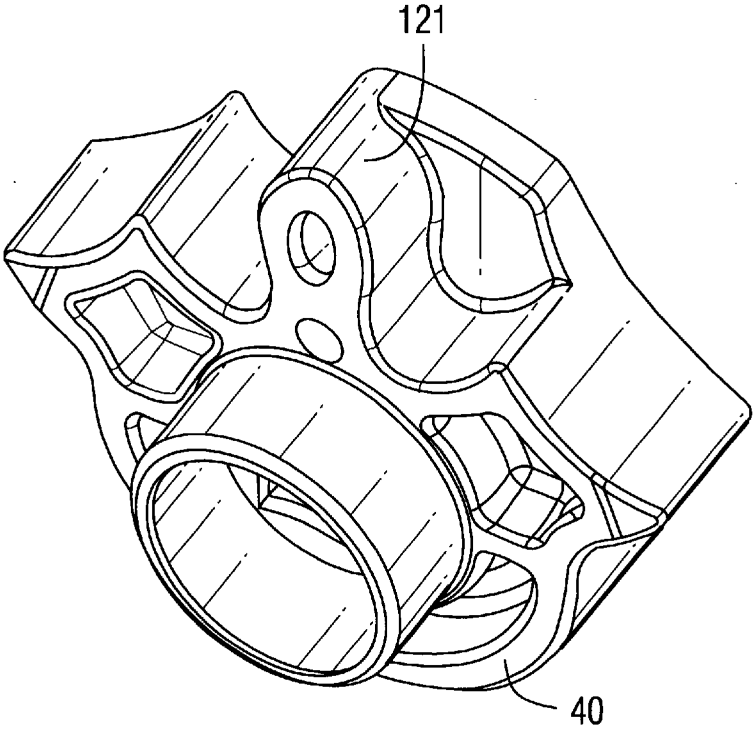

FIG. 7 is an end view of the driven gear 40. FIG. 8 is an isometric view of the driven gear 40 showing the single tooth 121. In FIG. 7, pockets 130 and 132 can be seen. These pockets provide the cavity into which the pin 61 can move when the connection is made between the shift shaft and the driven gear 40. When the pin 61 is moved out of pockets 130 and 132 in response to the disconnector 80 being moved toward the right in FIG. 1, the grove in gear 40 is disengaged from the tubular member 54 of the shift shaft assembly 50.

Figure 9:
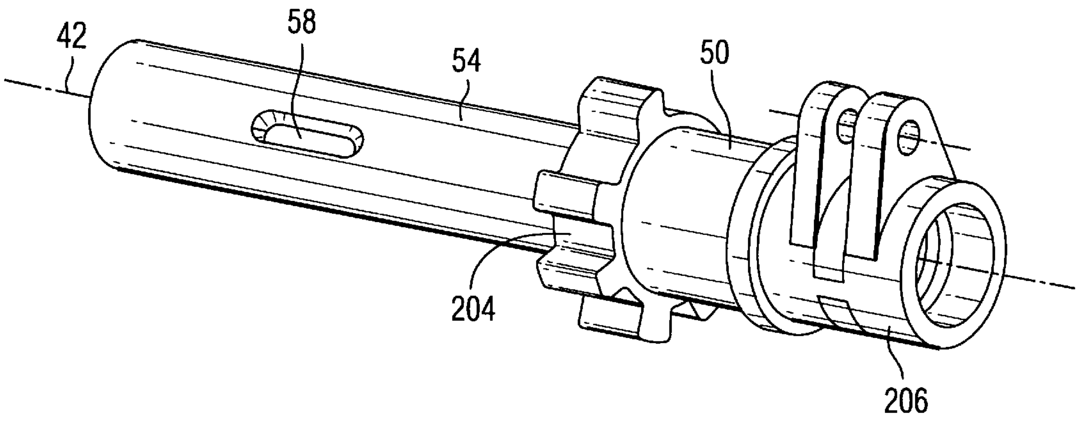
FIGS. 9 and 10 show the shift shaft assembly of the present invention.

FIG. 9 is an isometric view of the shift shaft assembly 50 with its tubular member 54. Slot 58 is shown in FIG. 9. It should be understood that another slot 59 exists on the opposite side of the tubular member 54 from slot 58. The pin 61 described above in conjunction with FIG. 1, extends through these slots in the tubular member 54. FIG. 9 also shows the shift detent feature 204 and the shift coupler 206 which are portions of the shift shaft assembly 50.

Figure 10:
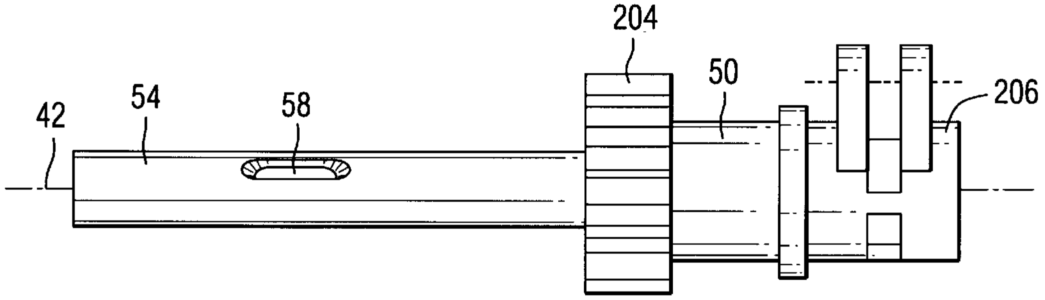

FIG. 10 is a side view of the shift shaft assembly 50 illustrated in FIG. 9. Although the shift shaft assembly 50 and the tubular member 54 do not move axially relative to the plates, 32 and 34, of the support bracket described above in conjunction with FIG. 1, the pin 61 is moveable in an axial direction with respect to axis 42 and within slots 58 and 59. This allows the pin 61 to either engage within the pockets, 130 and 132, or be moved toward the right and into the depression 70 within plate 34 to disengage the driven gear 40 from the tubular member 54 of the shift shaft assembly 50.

From the description of the preferred embodiment, as illustrated in FIGS. 1–10, it can be seen that the present invention provides the operator of an outboard motor with a means for disconnecting the shift shaft assembly 50 from the common pulley element 10 by pushing against the distal end of the disconnector 80 which extends partially through an opening 96 in the cowl 90. When a force is applied in the direction of arrow D in FIG. 1, the pin 61 is moved toward the right out of pockets 130 and 132 of the driven gear 40 and into space 70 of plate 34 to disengage the tubular member 54 from the driven gear 40. This disengagement allows the common pulley element 10 to rotate about axis 12 without causing the shift shaft assembly 50 to rotate about axis 42. As a result, the operator can change the operating speed of the engine by changing the throttle position and not change the gear selection at the same time. The independent movement of the driving gear 30 and driven gear 40 with respect to the shift shaft assembly 50 allows this throttle setting change to be made while the transmission remains in neutral gear position.

Although the present invention has been described with particular specificity and illustrated to show one particularly preferred embodiment of the present invention, it should be understood that alternative embodiments are also within its scope.

What is claimed is:

1. An outboard motor, comprising:

a manually movable member attached to a tiller handle;

a gear selecting mechanism responsive to movement of said manually movable member relative to said tiller handle for selecting one of at least two operating modes of said outboard motor;

a throttle mechanism which is responsive to said movement of said manually movable member relative to said tiller handle for changing the operating speed of said outboard motor;

a connector associated with said gear selecting mechanism and said throttle mechanism, said connector connecting said gear selecting mechanism and said throttle mechanism together for coordinated movement in response to said movement of said manually movable member;

a disconnector associated with said connector to disable said connector and permit said throttle mechanism to move independently of said gear selecting mechanism.

2. The outboard motor of claim 1, wherein:

said throttle mechanism comprises two cables arranged in a push-pull association with each other.

3. The outboard motor of claim 1, wherein: said two cables are connected to a common pulley member.

4. The outboard motor of claim 1, wherein:

said connector is a pin disposed in contact with both said gear selecting mechanism and said throttle mechanism.

5. The outboard motor of claim 4, wherein:

said disconnector is an actuator which moves said connector out of contact with a preselected one of said gear selecting mechanism and said throttle mechanism.

6. The outboard motor of claim 1, wherein:

said disconnector is manually movable.

7. The outboard motor of claim 6, wherein:

said disconnector extends partially through a cowl of said outboard motor and is movable by pushing an end of said disconnector toward an outer surface of said cowl.

8. An outboard motor, comprising:

a manually movable member, said manually movable member being attached to a tiller handle of said outboard motor;

a gear selecting mechanism responsive to movement of said manually movable member for selecting one of at least two operating modes of said outboard motor;

a throttle mechanism which is responsive to said movement of said manually movable member for changing the operating speed of said outboard motor;

a connector associated with said gear selecting mechanism and said throttle mechanism, said connector connecting said gear selecting mechanism and said throttle mechanism together for coordinated movement in response to said movement of said manually movable member;

a disconnector associated with said connector to disable said connector and permit said throttle mechanism to move independently of said gear selecting mechanism, said disconnector being an actuator which moves said connector out of contact with a preselected one of said gear selecting mechanism and said throttle mechanism.

9. The outboard motor of claim 8, wherein:

said throttle mechanism comprises two cables arranged in a push-pull association with each other.

10. The outboard motor of claim 9, wherein:

said two cables are connected to a common pulley member.

11. The outboard motor of claim 8, wherein:

said throttle mechanism comprises a link rod connected between said throttle mechanism and a throttle of an engine of said outboard motor.

12. The outboard motor of claim 11, wherein:

said connector is a pin disposed in contact with both said gear selecting mechanism and said throttle mechanism.

13. The outboard motor of claim 12, wherein:

said disconnector is manually movable.

14. The outboard motor of claim 13, wherein:

said disconnector extends partially through a cowl of said outboard motor and is movable by pushing an end of said disconnector toward an outer surface of said cowl.

15. An outboard motor, comprising:

a manually movable member, said manually movable member being attached to a tiller handle of said outboard motor;

a gear selecting mechanism responsive to movement of said manually movable member for selecting one of at least two operating modes of said outboard motor;

a throttle mechanism which is responsive to said movement of said manually movable member for changing the operating speed of said outboard motor;

a connector associated with said gear selecting mechanism and said throttle mechanism, said connector connecting said gear selecting mechanism and said throttle mechanism together for coordinated movement in response to said movement of said manually movable member;

a disconnector associated with said connector to disable said connector and permit said throttle mechanism to move independently of said gear selecting mechanism, said disconnector being an actuator which moves said connector out of contact with a preselected one of said gear selecting mechanism and said throttle mechanism, said connector being a pin disposed in contact with both said gear selecting mechanism and said throttle mechanism, said disconnector being manually movable.

16. The outboard motor of claim 15, wherein:

said throttle mechanism comprises two cables arranged in a push-pull association with each other.

17. The outboard motor of claim 16, wherein:

said two cables are connected to a common pulley member.

18. The outboard motor of claim 17, wherein:

said throttle mechanism comprises a link rod connected between said throttle mechanism and a throttle of an engine of said outboard motor.

19. The outboard motor of claim 18, wherein:

said disconnector extends partially through a cowl of said outboard motor and is movable by pushing an end of said disconnector toward an outer surface of said cowl.

* * * * *